Patented May 7, 1940

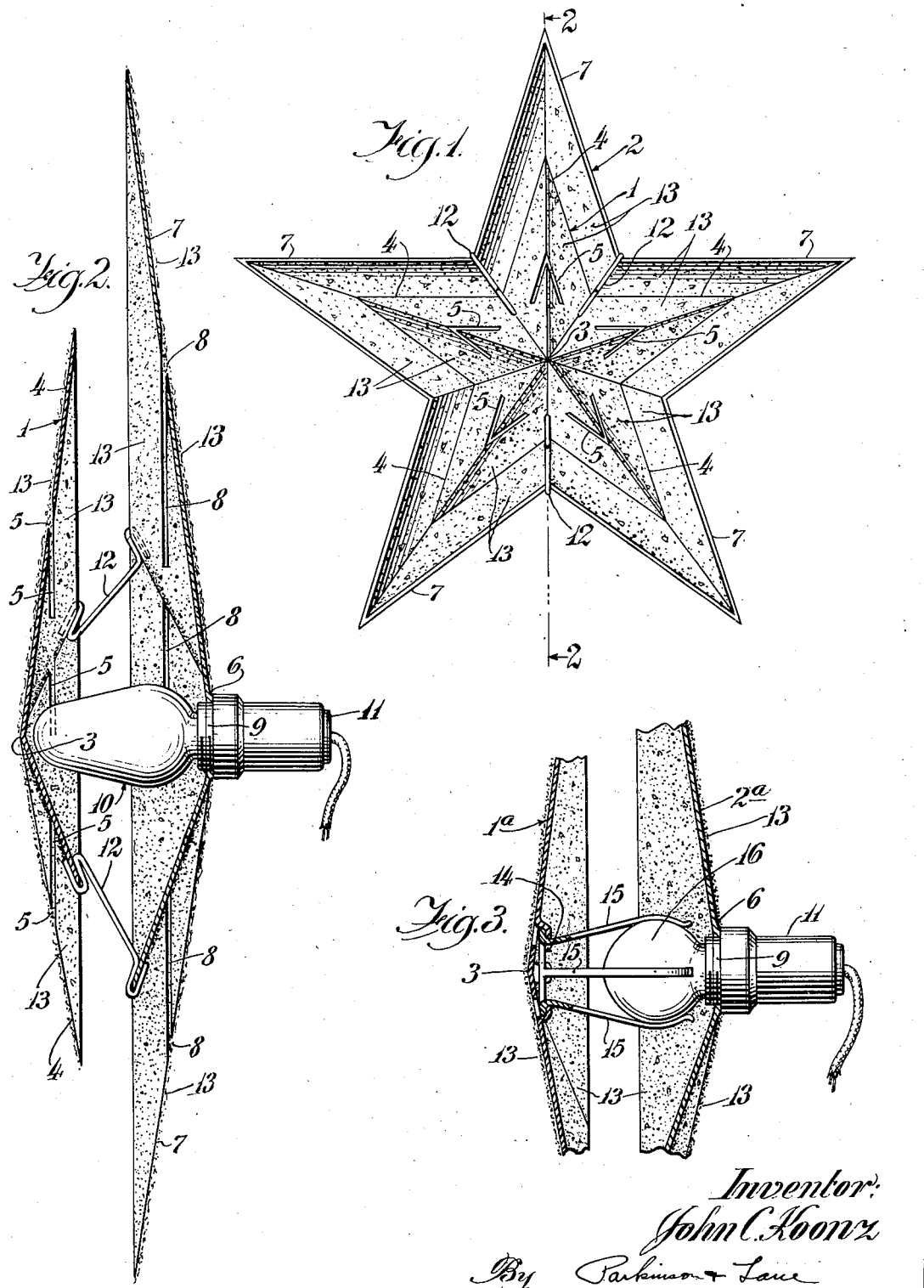

2,199,435

UNITED STATES PATENT OFFICE 2,199,435

DECORATIVE STAR

John C. Koonz, Fort Wayne, Ind.

Application October 24, 1938, Serial No. 236,629

1 Claim. (Cl. 240—10)

The present invention relates to a decorative device and more particularly to a novel decorative or illuminated star for decorating windows, doors, trees, etc., during the Christmas and Easter holiday season.

Among the objects of the present invention is to provide a novel assembly adapted to form an illuminated star and consisting of a pair of star-shaped members, one mounted or positioned behind a source of light and the other in front of the source in such manner and relationship as to give a unique star-lighted effect visible from both the front and rear of the assembly.

Another object is to provide a novel illuminated device consisting of a relatively large rear member and a similarly shaped front member between which is mounted a light bulb or other source of illumination. Each member is slit or formed with openings to permit the passage of the light rays so that the illuminated star is visible from either the front or back and thus providing a two-way star. The invention comprehends coating or surfacing the faces of the star-shaped members with a light reflecting substance which may be white or any desired color, and including broken glass, tinsel or other sparkling medium suitably glued or affixed to the surfaces.

A further object of the present invention is to provide a novel illuminated or decorative star consisting of a pair of star-shaped members suitably spaced apart with a light source of any desired color mounted or positioned therebetween and the members so slit or formed with cut-out portions as to permit the passage of light therethrough and with these slits or cut-out portions covered with light transmitting and/or diffusing material of desired color to enhance the effect of the illuminated star.

A further object is to provide a very simple and highly effective illuminated star which may be cheaply constructed and readily assembled. While I have shown in the accompanying drawing a preferred embodiment of my novel invention, it is to be understood that the same is susceptible of modification and change and comprehends other details, arrangements of parts, features and constructions without departing from the spirit of the invention.

In the drawing:

Fig. 1 is a view in front elevation of the novel star.

Fig. 2 is an enlarged view in vertical cross section taken in a plane represented by the line 2—2 of Fig. 1.

Fig. 3 is a fragmentary view in vertical cross section of an alternate form of the invention.

Referring more particularly to the disclosure in Figs. 1 and 2 of the drawing, the novel star comprises an outer star-shaped member 1 and an inner star-shaped member 2 spaced therefrom and of considerably larger dimensions so as to give a double star effect. The stars are of substantially the same contour with the outer star formed to provide an apex at 3 with the points 4 so shaped or dished that a section therethrough would be substantially V-shaped. Each point is also provided with a substantially V-shaped cut-out or slot at 5 for the transmission of light therethrough.

The inner and larger star 2 is formed in a manner similar to that of the outer star with an apex 6 and the points 7 so formed or dished that a cross section therethrough forms a V. This member is also provided with substantially V-shaped slots or openings 8 for the transmission of light therethrough. The apex of the inner star-shaped member is provided with an opening for the reception of the stem 9 of a bulb or light source 10. This stem is adapted to be received within the usual socket 11. By mounting the members 1 and 2 in opposed relation in the manner more clearly shown in Fig. 2, they provide a space or chamber for the reception of the bulb or light source 10 and the bulb is readily inserted or removed from the front of the star. In order to maintain the inner and outer members in spaced relationship I provide spaced clips 12 adapted to be clamped over the edges of the members. These clips may be of wire or any material or construction suitable for the purpose.

By placing slots or openings in both stars I provide a two-way illuminated star in which the illuminated portions are visible from the rear or inside as well as from the front or outside of the window or doorway. In order to give a highly decorative effect to the star the inner and/or outer surface of the stars are preferably coated with a light reflecting or diffusing substance. For this purpose I have secured excellent results by providing a coating 13 of relatively thin glass particles of flaky consistency so that these particles cover relatively large areas. These particles are suitably coated, sprayed or otherwise affixed to the inner and/or outer surfaces of the star-shaped members and due to their size, bridge the openings or slots and thereby provide a coating or covering over all or a part of the slotted portions or openings to diffuse the light passing therethrough. This gives a brilliant, sparkling effect. In order to enhance this effect the inner faces or complementary surfaces of the two stars may be white and the outer faces of these stars colored. Also, different colored glass particles may be coated on the reflecting and diffusing surfaces and different colored bulbs used so as to give different colored lighting and sparkling effect.

In Fig. 3 I disclose an alternate construction in which the outer star-shaped member 1a and the inner star-shaped member 2a are substantially the same construction as in the form shown in Figs. 1 and 2. In this form, however, the outer member is provided with a clip 14 having a plurality of spring fingers 15 adapted to grip the bulb or light source 16 and support and maintain the outer star-shaped member in its predetermined spaced position relative to the inner member.

It will be readily appreciated from the above description and the disclosure in the drawing that I provide a highly effective illuminated and decorative star providing for two-way illumination or visibility so that its effect may be appreciated from the rear or inside of a window or doorway as well as from the outside. Also by providing light transmitting and diffusing material over the slotted portions, the light is given a sparkling effect which further enhances the beauty of the design. The members may be made of paper or any other material suitable for the purpose which make for cheapness of construction. The means for attaching the outer star-shaped member are so arranged as to permit the bulb or light source to be readily inserted or removed from the front thus permitting ready assembly or disassembly.

Having thus disclosed my invention, I claim:

A decorative device, comprising an outer and an inner star-shaped member, clip means for holding these members in spaced relation, cutout portions in the points of the stars for the transmission of light therethrough to the front and rear of the device to provide a two-way star which, when placed in a window or doorway, is visible to the inside as well as the outside, light reflecting material coated onto the surfaces of the members for reflecting and diffusing the light and giving a sparkling effect, and a light bulb positioned intermediate the members and providing a support for said members, said clip means comprising a plurality of clips, each clip having hooked portions at its opposite ends, said portions being located in the same plane but having the hooks arranged at acute angles to each other whereby said portions may engage adjacent the bases of each star-shaped member to maintain them in spaced relationship to each other.

JOHN C. KOONZ.